United States Patent [19]

Masegi et al.

[11] Patent Number: 4,835,514
[45] Date of Patent: May 30, 1989

[54] CAR THEFT ALARM SYSTEM

[75] Inventors: Mitsuhiko Masegi, Aichi; Masao Sakurai, Obu; Makoto Aso, Kariya, all of Japan

[73] Assignees: Nippondenso Co., Ltd., Kariya; Toyota Jidosha Kabushiki Kaisha, Toyota, both of Japan

[21] Appl. No.: 42,748

[22] Filed: Apr. 27, 1987

[30] Foreign Application Priority Data

Apr. 29, 1986 [JP] Japan ................................. 61-99542

[51] Int. Cl.⁴ ............................................ B60R 25/00
[52] U.S. Cl. .................................. 340/426; 307/10.2; 180/287
[58] Field of Search ............................ 340/63, 64, 65; 180/287, 289; 116/33; 307/10 AT

[56] References Cited

U.S. PATENT DOCUMENTS

| 3,665,386 | 5/1972 | Dosch | 340/63 |
| 3,781,854 | 12/1973 | Kaufman et al. | 340/64 |
| 3,967,166 | 6/1976 | Wei | 307/10 AT |
| 4,307,789 | 12/1981 | Bertot | 180/289 |
| 4,494,114 | 1/1985 | Kaish | 340/63 |
| 4,641,124 | 2/1987 | Davis | 307/10 AT |

FOREIGN PATENT DOCUMENTS 57-104439  6/1982  Japan .
59-45245   3/1984  Japan .
59-45456   3/1984  Japan .

Primary Examiner—Joseph A. Orsino
Assistant Examiner—Jill D. Jackson
Attorney, Agent, or Firm—Cushman, Darby & Cushman

[57] ABSTRACT

An antitheft system comprises a prohibition device for prohibiting the alarming operation upon receipt of a disarmed memory signal. When an arming signal is inputted, an alarm is generated on the receipt of a theft detection signal generated by handling or operation of vehicle equipment or accessories. When a disarming signal is received, on the other hand, it is stored and held as the disarmed memory signal in power-supply disconnected state.

8 Claims, 1 Drawing Sheet

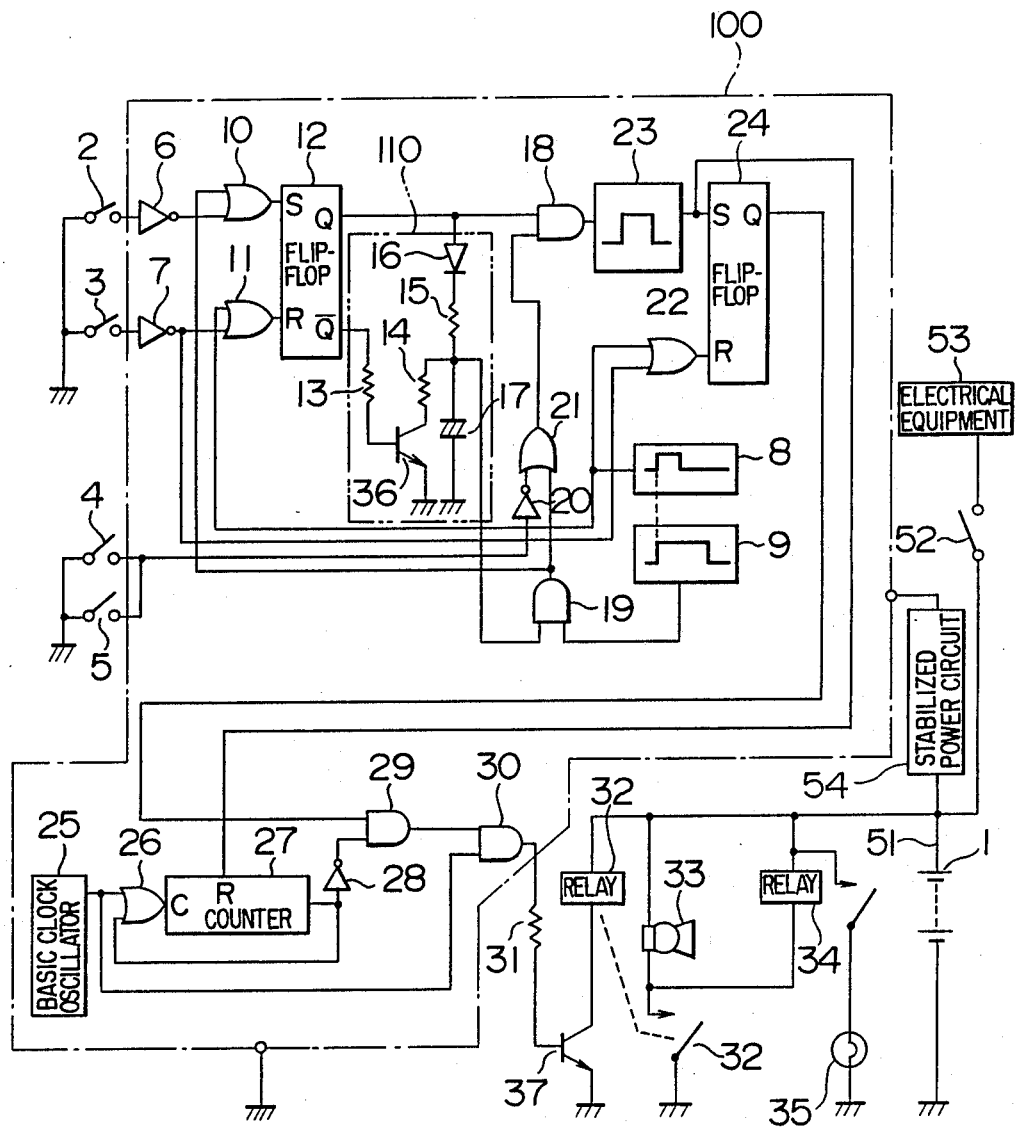

CAR THEFT ALARM SYSTEM

BACKGROUND OF THE INVENTION

1. Field of the Invention

The present invention relates to a car theft alarm system or an antitheft system for generating an alarm when the vehicle is about to be stolen by unlawful operation.

2. Description of the Prior Art

Vehicle theft alarm apparatuses have conventionally been conceived for preventing the vehicle or the equipment mounted thereon from being stolen. In these apparatuses, a certain operation of the driver places the vehicle on vigilance or armed state. Under this vigilance state, if the vehicle door or bonnet being opened is detected, a large buzzer sound or the like alarm is issued to give warnings to related persons. An example of such apparatuses is disclosed in JP-A-57-104439.

In conventional apparatuses, once the power line between the apparatuses and a car power supply is disconnected, it is impossible to issue a proper alarm even if it is reconnected.

SUMMARY OF THE INVENTION

The object of the present invention is to provide a vehicle theft alarm system in which after the power line is disconnected by the user or the like for the purpose of car repair, a proper alarm is capable of being issued by preventing an erroneous alarm from being generated when the power line is reconnected.

According to one aspect of the present invention, there is provided an antitheft system for a vehicle comprising:
an alarm device mounted on said vehicle;
theft detection means for detecting a theft act associated with said vehicle; and
a control device supplied with power from a battery mounted on the vehicle for actuating the alarm device upon detection of the theft act by the theft detection means;
said control device including setting means for setting the control device in armed mode and resetting said control device in disarmed mode, memory means for storing the arming and disarming modes regardless of suspension of power supply from the battery, a power supply start detection means for detecting the power supply start from the battery and generating a pulse signal temporarily, and alarm signal generating means for identifying the pulse signal from the power supply start detection means and generating an alarm signal for actuating the alarm device when the arming mode is stored in said memory means.

According to another aspect of the invention, the memory means includes a capacitor for storing charges.

According to still another aspect of the invention, the detection means includes a theft detection switch for turning on when opening at least one of doors, bonnet and engine hood of the vehicle.

According to the present invention, as explained above, the theft alarm system is prevented from actuation in disarmed mode or non-vigilance state, even if the power line is disconnected and theft detection means issues a theft signal, since the memory means keeps the disarmed mode or non-vigilance state in memory.

To the extent that the vehicle is in non-vigilance state before the power line is disconnected, therefore, the particular state is stored and held to prevent the operation of the theft alarm system. As a result, even if the user or the like disconnects the power line for the purpose of car repair, an erroneous alarm is not generated at the time of reconnection, but a proper alarm is issued at proper time. For example, if the arming mode is stored before disconnection of the power line, the reconnection of the power line enables the operation of the alarm device to surely prevent theft of the vehicle.

BRIEF DESCRIPTION OF THE DRAWINGS

The accompanying drawing is a circuit diagram showing an embodiment of the present invention.

DESCRIPTION OF THE PREFERRED EMBODIMENTS

Reference numeral 1 designates a battery mounted on the car, which is chargeable by being connected to a generator not shown. The battery 1 is connected through a power line 51 and an ignition key switch 52 to electrical vehicle equipment 53 such as an engine starter on the one hand, and through the power line 51 and a stabilized power circuit 54 to a control circuit 100 on the other hand. Numeral 2 designates a set switch for producing a set signal for setting the car theft alarm system in armed mode. Specifically, such a switch is adapted to turn on and generate a set signal when the doors are locked from outside the car with the key. Numeral 3 designates a reset switch for resetting, the car theft alarm system from armed mode to disarmed mode. Such a reset switch is adapted to turn on and produce, for instance, a reset signal when the doors are unlocked by the key. Numerals 4, 5 designate theft detection switches to detect theft acts associated with the vehicle. Theft detection switch 4 or 5 turns on and producing a theft signal, for example, when at least one of the doors, trunk and engine hood is opened. Numeral 6, 7 designates an inverter. Numeral 8, 9 designates a power-on reset pulse generator. The pulse generator 9 generates a pulse somewhat longer than the pulse generator 9. The pulse generation 9 functions as power connection detection means for generating a pulse of power connection signal when the power line 51 is connected to turn power. Numeral 10, 11 designates an OR circuit, which is connected to the set inputs S and R of a flip-flop 12 respectively.

The flip-flop 12 making up arming means produces a high-level signal H making up an arming signal at an output Q upon application thereto of a set signal, and a low-level signal L making up a disarming signal at the output Q.

Numeral 13, 14, 15 designates a resistor, and numeral 16 a diode. Numeral 17 designates a system mode memory capacitor which is rapidly charged through the diode 16 and the resistor when the flip-flop 12 is set, and rapidly discharged through the resistor 14 and a transistor 36 when the flip-flop 12 is reset. These component parts make up a memory circuit 110. If the power line 51 is disconnected with the flip-flop 12 set or reset, the state involved is stored as a potential of the capacitor 17 and held as an armed memory signal or a disarmed memory signal, respectively.

Numerals 18, 19 designate AND circuits, and numerals 20, 21 an inverter circuit and an OR circuit respectively. The AND circuit 19, supplied with signals from the memory circuit 110 and the pulse generator 9, is adapted to apply a high-level signal H making up a set signal for setting the S terminal of the flip-flop 12 and a theft signal respectively in accordance with the signal from the pulse generator 9 to the OR circuits 10 and 21 when impressed with an armed memory signal from the memory circuit 110, and to function as prohibition means for prohibiting an output signal when impressed with a disarmed memory signal. Numeral 23 designates a differentiator for continuing to produce a pulse for a predetermined length of time from the output of the AND circuit 18 becomes "high", and numeral 24 a flip-flop set by the output of the differentiator 23. The flip-flop 24 operates as an alarm signal shaping means for shaping the alarm signal. Numerals 25, 26 and 27 designate a timer for setting an alarm time, of which numeral 25 designates a basic clock oscillator, numeral 26 an OR circuit, and numeral 27 a counter. The counter 27 is reset by an output from the differentiator 23. Numerals 29, 30 designates an AND circuit, numeral 31 a resistor, numeral 37 a transistor, and numeral 32 a relay. The contact 32a of the relay 32 is connected in a manner to energize a horn 33 and a light relay 34. Numerals 33 and 35 designate the horn and a headlight as an example of the alarm means.

Now, the operation of the circuit configured as above will be explained.

First, the setting the system into armed mode and the resetting thereof into the disarmed mode will be explained.

(System set)

When the set switch 2 is turned on, a set signal is generated, and the output of the inverter 6 and the OR circuit 10 becomes "H", so that the output Q of the flip-flop 12 becomes "H" indicating the arming signal. At this time, the capacitor 17 is charged full as current flows through the diode 16 and the resistor 15. Under normal state (other than when power is on with the power line is disconnected and reconnected), the power-on reset pulse generator 9 does not generate an signal, and therefore the output of the AND circuit 19 is "L". Also, the theft detection switches 4 and 5 are off, and the OR circuit thus produces an "L" signal. This state is called the armed mode.

(System reset)

Upon turning on the reset switch 3 under the armed mode, a reset signal is generated, and the outputs of the inverter 7 and the OR circuit 11 become "H", with the result that the output Q becomes "L" indicating the disarming signal, while the output $\overline{Q}$ becomes "H". As a consequence, the transistor 36 turns on, and the capacitor 17 is rapidly discharged into the disarmed mode, that is, the initial state.

Now, explanation will be made of the case in which an alarm is issued against the theft.

Assume that one of the theft detection switches 4 and 5 is turned on in the armed mode. A theft signal is generated, and the output of the inverter 20 becomes "H", and so does the output of the OR circuit 21. Since the Q output of the flip-flop 12 is "H" indicating the arming signal, the output of the AND circuit becomes also "H". The differentiation circuit 23 accordingly produces a pulse. This pulse causes the flip-flop 24 to be set and generates an alarm signal "H", thereby resetting the counter 27. Therefore, the output of the inverter 28 becomes "H". This state and the signal from the basic oscillator 25 are applied to an AND circuit 30, so that the output of the AND circuit 30 repeats on-off state. The transistor 37, and relays 32, 34 are thus energized, and ah alarm is generated by the repetitive on-off states of the horn 33 and headlight 35. With the lapse of a predetermined time after alarm generation, the output of the counter 27 becomes "H", and the output of the inverter 28 "L", thus stopping the alarm. During and after the alarm, the reset switch 3 may be operated to reset and restore the flip-flop 12 and 24 to the initial state in the same manner as mentioned above.

(Alarm with battery disconnected)

Assume that the power line 51 connected with the battery 1 is disconnected to cut off power to the control circuit 100 when the vehicle theft alarm system is in armed mode. Since the diode 16 is reversely biased and the transistor 36 is off, the capacitor 17 has no discharge route, and therefore continues to hold the charges thereof as an armed mode memory signal until self-discharge. Under this condition, if the power line 51 is connected to the battery 1 in order to energize electrical parts 53 mounted on the vehicle, the operation described below is performed.

The power-on reset pulse generators 8 and 9 generate a pulse as a power connection signal. The output of the pulse generator 8 is applied to the reset input R of the flip-flops 12 and 24. Since the potential of the capacitor 17 is "H", the output "H" of the pulse generator 9 is applied through the AND circuit to the set input terminal of the flip-flop 12 as a reset signal. In view of the fact that the pulse of the pulse generator 9 is longer than that of the pulse generator 8, the flip-flop 12 is set without fail and the output Q becomes "H" indicating the arming signal at the time point when the pulse of the pulse generator 8 ceases. The output "H" of the AND circuit 19, on the other hand, is applied as a theft signal through the OR circuit 21 to the AND circuit 18. As a result, the output of the AND circuit 18 also becomes "H", and the differentiation circuit 23 generates a pulse, so that an alarm is issued through the same processes as mentioned above. In this way, even in the case where the power line 51 is unlawfully disconnected and reconnected, such event is stored and held to issue an alarm positively, to the extent that the system is set in armed mode immediately before the battery disconnection.

Now, explanation will be made of the operation for prohibiting the alarm when the power line is connected in the initial state, that is, when the system is set in disarmed mode by the reset operation, as when the user normally intends to do the repair work.

In disarmed mode, the capacitor 17 is in discharged state of "L". If the power line 51 is disconnected under this condition, the capacitor 17 continues to hold "L" as a disarmed mode memory signal. If the power line 51 is connected after that, the power-on reset pulse generators 8 and 9 generate a pulse as a power connection signal. Since the AND circuit 19 is impressed with an "L" signal as a disarmed mode memory signal, the production of "H" signal is prohibited as a reset signal or theft signal. If the mode before battery is disarmed, therefore, the particular mode is stored and held, thus prohibiting the alarm.

Instead of charging the capacitor 17 when the system enters the arming operation mode as mentioned above, the capacitor 17 may be charged upon issuance of an alarm.

Also, without using switches for generating set and reset signals for the system, set and reset signals may be generated by a different method such as key-in control of a code number or by use of a signal produced from a wireless device for locking and unlocking the door. A theft detection switch, which may be used with equal effect at the same time or in place of the switches 4, 5, includes a trunk detection switch for detecting that the trunk is open, a hood detection switch for detecting that the engine hood is open, an unlock detection switch for detecting the unlocking of the door, ultrasonic means for detecting the breakage or removal of the glass, or an inclination sensor. Further, instead of the alarm means used in the embodiment described above, means may be used for prohibiting energization of the starter by the starter relay, turning on the beacon lamp mounted on the roof of the vehicle, or informing the user directly by means of a transmitter-receiver.

Also, as the means for storing the state before disconnection, the circuit using a capacitor may be replaced with equal effect by a circuit with a latching relay, or such a memory as a disarmed memory or core memory.

In the above-mentioned embodiment, as explained in the section (Alarm with battery disconnected), an is issued by generating a reset signal to the flip-flop 12 and a theft signal to the OR circuit 21 through the AND circuit 19 in the case where the system is in the vigilance operation mode before battery disconnection. Instead of using the two signals, however, one of the reset signal and the theft signal may be used. If the reset signal alone is involved, a switch is used for generating a theft signal when the bonnet or the door is closed as a theft detection switch. In this manner, no alarm is issued when the battery is connected, but when the bonnet or door is closed subsequently. In the case where the theft signal alone is used, on the other hand, this signal is applied directly to the set S of the flip-flop 24 making up an alarm signal forming means, so that an alarm may be issued without resetting the flip-flop 12 into the vigilance mode.

We claim:

1. An antitheft system for a vehicle comprising:
   an alarm device mounted on said vehicle;
   theft detection means for detecting a theft act associated with said vehicle; and
   a control means supplied with power without passing through an ignition switch from a battery mounted on the vehicle for actuating the alarm device upon detection of the theft act by the theft detection means, said control means including:
   setting means for setting the control means in an armed mode and resetting said control means in a disarmed mode,
   memory means for storing one of the armed and disarmed modes regardless of termination of power from the battery,
   power supply start detection means for detecting an initial supply of power from the battery and generating a pulse signal temporarily, and
   alarm signal generating means for identifying the pulse signal from the power supply start detection means and generating an alarm signal for actuating the alarm device regardless of the detection condition of said theft detection means when the armed mode is stored in said memory means.

2. An antitheft system according to claim 1, wherein said memory means includes a capacitor for storing charges.

3. An antitheft system according to claim 1, wherein said theft detection means includes a theft detection switch for turning on when at least one of doors, trunk, and engine hood provided for said vehicle is open.

4. An antitheft system according to claim 1, wherein said setting means is operated manually to set or reset the control device in the armed mode or the disarmed mode.

5. An antitheft system according to claim 1, wherein said alarm signal generating means generates said alarm signal for a predetermined period of time.

6. An antitheft system for a vehicle comprising:
   an alarm device mounted on said vehicle;
   theft detection means for detecting a theft act associated with said vehicle; and
   a control device supplied with power without passing through an ignition switch from a battery mounted on the vehicle for actuating the alarm device upon detection of the theft act by the theft detection means, said control device including:
   manual manipulation means for setting said control device in armed mode and resetting said control device in disarmed mode,
   memory means for storing one of the armed and disarmed modes, said memory means having a capacitor and a charging and discharging circuit, one of a charging operation and a discharging operation of said charging and discharging circuit being controlled in accordance with the mode set by said manual manipulation means so that a charge accumulating condition of said capacitor is set,
   power supply start detection means for detecting a recovery from intentional disconnection of power to said control device from a battery mounted on said vehicle and for generating a pulse signal for a predetermined time, and
   alarm signal generating means for identifying the pulse signal from the power supply start detection means and for generating an alarm signal for actuating the alarm device regardless of the detection condition of said theft detection means when the armed mode is stored in said memory means.

7. An antitheft system according to claim 6, wherein said alarm signal generating means generates said alarm signal for a predetermined period of time.

8. An antitheft system according to claim 6, wherein said alarm signal generating means generates the alarm signal regardless of whether said control device is in a set condition or a reset condition when a detection signal is received from said theft detection means.

* * * * *